(12) United States Patent
Epstein et al.

(10) Patent No.: US 8,793,487 B2
(45) Date of Patent: Jul. 29, 2014

(54) BINDING A DIGITAL CERTIFICATE TO MULTIPLE TRUST DOMAINS

(75) Inventors: William C. Epstein, Salt Lake City, UT (US); Lawrence R. Miller, Redding, CT (US)

(73) Assignee: Identrust, Inc., San Francisco, CA (US)

( * ) Notice: Subject to any disclaimer, the term of this patent is extended or adjusted under 35 U.S.C. 154(b) by 770 days.

(21) Appl. No.: 12/321,260

(22) Filed: Jan. 16, 2009

(65) Prior Publication Data

US 2009/0210703 A1  Aug. 20, 2009

Related U.S. Application Data

(60) Provisional application No. 61/011,668, filed on Jan. 18, 2008.

(51) Int. Cl.
| H04L 29/06 | (2006.01) |
| H04L 9/00 | (2006.01) |
| H04L 9/32 | (2006.01) |
| G06Q 20/02 | (2012.01) |
| G06F 21/33 | (2013.01) |

(52) U.S. Cl.
CPC .............. H04L 9/006 (2013.01); H04L 9/3294 (2013.01); H04L 9/3263 (2013.01); H04L 63/20 (2013.01); H04L 63/0442 (2013.01); H04L 63/0823 (2013.01); H04L 9/3281 (2013.01); G06Q 20/02 (2013.01); G06F 21/33 (2013.01)
USPC ........... 713/157; 713/155; 713/156; 713/158; 713/173; 713/175; 713/176; 713/177; 726/1

(58) Field of Classification Search
CPC ... H04L 63/0823; H04L 9/006; H04L 9/3263; H04L 63/20; H04L 63/0442; H04L 9/3294; H04L 9/3281; G06Q 20/02; G06F 21/33

USPC .......................................................... 713/157
See application file for complete search history.

(56) References Cited

U.S. PATENT DOCUMENTS

| 4,304,990 A | 12/1981 | Atalla |
| 5,048,085 A | 9/1991 | Abraham et al. |

(Continued)

FOREIGN PATENT DOCUMENTS

| EP | 0 784 282 A2 | 7/1997 |
| JP | 2003-030358 | 1/2003 |

(Continued)

OTHER PUBLICATIONS

ABA School of Bank Card Management, http://www.aba.com/aba/ConferencesandEducation/SCH_BC99.asp.

(Continued)

*Primary Examiner* — David Pearson
*Assistant Examiner* — Narciso Victoria
(74) *Attorney, Agent, or Firm* — Eric Sophir; Dentons US LLP

(57) ABSTRACT

A public key infrastructure comprising a participant that issues digital certificates. Each digital certificate can be relied upon in at least two different trust domains. The public key infrastructure does not employ policy mapping between or among the trust domains. Furthermore, the public key infrastructure does not link any pair of trust domains via cross-certificates. Just one trust domain is bound to the digital certificate at any given moment. The current trust domain that is to be bound to the digital certificate is elected by a relying party at the time of reliance, based upon a specific certificate validation methodology selected by the relying party.

15 Claims, 6 Drawing Sheets

1st Embodiment – Self Signed Certificate

(56) References Cited

U.S. PATENT DOCUMENTS

| | | |
|---|---|---|
| 5,191,193 A | 3/1993 | LeRoux |
| 5,353,350 A | 10/1994 | Unsworth et al. |
| 5,389,738 A | 2/1995 | Piosenka et al. |
| 5,406,630 A | 4/1995 | Piosenka et al. |
| 5,448,045 A | 9/1995 | Clark |
| 5,453,601 A | 9/1995 | Rosen |
| 5,511,121 A | 4/1996 | Yacobi |
| 5,557,518 A | 9/1996 | Rosen |
| 5,604,801 A | 2/1997 | Dolan et al. |
| 5,615,269 A | 3/1997 | Micali |
| 5,623,637 A | 4/1997 | Jones et al. |
| 5,638,446 A | 6/1997 | Rubin |
| 5,659,616 A | 8/1997 | Sudia |
| 5,668,878 A | 9/1997 | Brands |
| 5,671,279 A | 9/1997 | Elgamal |
| 5,677,955 A | 10/1997 | Doggett et al. |
| 5,680,455 A | 10/1997 | Linsker et al. |
| 5,689,565 A | 11/1997 | Spies et al. |
| 5,694,471 A | 12/1997 | Chen et al. |
| 5,703,949 A | 12/1997 | Rosen |
| 5,706,427 A | 1/1998 | Tabuki |
| 5,717,989 A | 2/1998 | Tozzoli et al. |
| 5,721,781 A | 2/1998 | Deo et al. |
| 5,745,571 A | 4/1998 | Zuk |
| 5,745,574 A | 4/1998 | Muftic |
| 5,754,772 A | 5/1998 | Leaf |
| 5,784,612 A | 7/1998 | Crane et al. |
| 5,790,677 A | 8/1998 | Fox et al. |
| 5,809,144 A | 9/1998 | Sirbu et al. |
| 5,815,657 A | 9/1998 | Williams et al. |
| 5,841,866 A | 11/1998 | Bruwer et al. |
| 5,842,211 A | 11/1998 | Horadan et al. |
| 5,845,260 A | 12/1998 | Nakano et al. |
| 5,847,374 A | 12/1998 | Menconi |
| 5,850,442 A | 12/1998 | Muftic |
| 5,861,662 A | 1/1999 | Candelore |
| 5,870,473 A | 2/1999 | Boesch et al. |
| 5,889,863 A | 3/1999 | Weber et al. |
| 5,892,900 A | 4/1999 | Ginter et al. |
| 5,903,882 A | 5/1999 | Asay et al. |
| 5,909,492 A | 6/1999 | Payne et al. |
| 5,913,210 A | 6/1999 | Call |
| 5,920,629 A | 7/1999 | Rosen |
| 5,920,847 A | 7/1999 | Kolling et al. |
| 5,937,068 A | 8/1999 | Audebert |
| 5,943,424 A | 8/1999 | Berger et al. |
| 5,944,789 A | 8/1999 | Tzelnic et al. |
| 5,956,404 A | 9/1999 | Schneier et al. |
| 5,958,051 A | 9/1999 | Renaud et al. |
| 5,970,475 A | 10/1999 | Barnes et al. |
| 5,987,440 A | 11/1999 | O'Neil et al. |
| 5,991,750 A | 11/1999 | Watson |
| 6,003,007 A | 12/1999 | DiRienzo |
| 6,003,765 A | 12/1999 | Okamoto |
| 6,014,646 A | 1/2000 | Vallee et al. |
| 6,029,150 A | 2/2000 | Kravitz |
| 6,035,402 A | 3/2000 | Vaeth et al. |
| 6,038,551 A | 3/2000 | Barlow et al. |
| 6,039,248 A | 3/2000 | Park |
| 6,044,350 A | 3/2000 | Weiant, Jr. et al. |
| 6,044,462 A | 3/2000 | Zubeldia et al. |
| 6,052,785 A | 4/2000 | Lin et al. |
| 6,067,621 A | 5/2000 | Yu et al. |
| 6,072,870 A | 6/2000 | Nguyen et al. |
| 6,081,790 A | 6/2000 | Rosen |
| 6,085,168 A | 7/2000 | Mori et al. |
| 6,085,321 A | 7/2000 | Gibbs et al. |
| 6,092,196 A | 7/2000 | Reiche |
| 6,092,201 A | 7/2000 | Turnbull et al. |
| 6,105,012 A | 8/2000 | Chang et al. |
| 6,115,642 A | 9/2000 | Brown et al. |
| 6,125,349 A | 9/2000 | Maher |
| 6,134,327 A | 10/2000 | Van Oorschot |
| 6,134,550 A | 10/2000 | Van Oorschot |
| 6,138,107 A | 10/2000 | Elgamal |
| 6,141,679 A | 10/2000 | Schaefer et al. |
| 6,154,844 A | 11/2000 | Touboul et al. |
| 6,157,721 A | 12/2000 | Shear et al. |
| 6,157,917 A | 12/2000 | Barber |
| 6,157,920 A | 12/2000 | Jakobsson et al. |
| 6,157,927 A | 12/2000 | Schaefer et al. |
| 6,170,058 B1 | 1/2001 | Kausik |
| 6,175,921 B1 | 1/2001 | Rosen |
| 6,182,052 B1 | 1/2001 | Fulton |
| 6,185,683 B1 | 2/2001 | Ginter et al. |
| 6,209,091 B1 | 3/2001 | Sudia et al. |
| 6,223,291 B1 | 4/2001 | Puhl et al. |
| 6,233,339 B1 | 5/2001 | Kawano et al. |
| 6,236,972 B1 | 5/2001 | Shkedy |
| 6,272,675 B1 | 8/2001 | Schrab et al. |
| 6,285,991 B1 | 9/2001 | Powar |
| 6,292,569 B1 | 9/2001 | Shear et al. |
| 6,301,658 B1 | 10/2001 | Koehler |
| 6,304,658 B1 | 10/2001 | Kocher et al. |
| 6,314,517 B1 | 11/2001 | Moses et al. |
| 6,324,525 B1 | 11/2001 | Kramer et al. |
| 6,327,578 B1 | 12/2001 | Linehan |
| 6,330,551 B1 | 12/2001 | Burchetta et al. |
| 6,341,353 B1 | 1/2002 | Herman |
| 6,353,812 B2 | 3/2002 | Frankel et al. |
| 6,356,878 B1 | 3/2002 | Walker et al. |
| 6,363,365 B1 | 3/2002 | Kou |
| 6,363,479 B1 | 3/2002 | Godfrey et al. |
| 6,370,249 B1 | 4/2002 | Van Oorschot |
| 6,373,950 B1 | 4/2002 | Rowney |
| 6,385,651 B2 | 5/2002 | Dancs et al. |
| 6,449,598 B1 | 9/2002 | Green et al. |
| 6,477,513 B1 | 11/2002 | Walker |
| 6,490,358 B1 | 12/2002 | Geer, Jr. et al. |
| 6,490,367 B1 | 12/2002 | Carlsson et al. |
| 6,496,858 B1 | 12/2002 | Frailong et al. |
| 6,510,513 B1 | 1/2003 | Danieli |
| 6,510,518 B1 | 1/2003 | Jaffe et al. |
| 6,523,027 B1 | 2/2003 | Underwood |
| RE38,070 E | 4/2003 | Spies et al. |
| 6,560,581 B1 | 5/2003 | Fox et al. |
| 6,598,027 B1 | 7/2003 | Breen, Jr. et al. |
| 6,601,233 B1 | 7/2003 | Underwood |
| 6,601,759 B2 | 8/2003 | Fife et al. |
| 6,609,128 B1 | 8/2003 | Underwood |
| 6,633,878 B1 | 10/2003 | Underwood |
| 6,643,701 B1 | 11/2003 | Aziz et al. |
| 6,658,568 B1 | 12/2003 | Ginter et al. |
| 6,675,153 B1 | 1/2004 | Cook et al. |
| 6,704,873 B1 | 3/2004 | Underwood |
| 6,711,679 B1 | 3/2004 | Guski et al. |
| 6,715,080 B1 | 3/2004 | Starkovich et al. |
| 6,718,470 B1 | 4/2004 | Adams et al. |
| 6,718,535 B1 | 4/2004 | Underwood |
| 6,763,459 B1 | 7/2004 | Corella |
| 6,766,454 B1 | 7/2004 | Riggins |
| 6,853,988 B1 | 2/2005 | Dickenson et al. |
| 6,865,674 B1 | 3/2005 | Mancini et al. |
| 6,889,325 B1 | 5/2005 | Sipman et al. |
| 6,973,571 B2 | 12/2005 | Lee et al. |
| 7,000,105 B2 | 2/2006 | Tallent, Jr. et al. |
| 7,072,870 B2 | 7/2006 | Tallent, Jr. et al. |
| 7,076,784 B1 | 7/2006 | Russell et al. |
| 7,080,251 B2 | 7/2006 | Fujishiro et al. |
| 7,080,409 B2 | 7/2006 | Eigeles |
| 7,100,195 B1 | 8/2006 | Underwood |
| 7,130,998 B2 | 10/2006 | Balfanz et al. |
| 7,165,178 B2 | 1/2007 | Gein et al. |
| 7,167,985 B2 | 1/2007 | Ahmed |
| 7,177,839 B1 | 2/2007 | Claxton |
| 7,200,573 B2 | 4/2007 | Miller et al. |
| 7,206,805 B1 | 4/2007 | McLaughlin, Jr. |
| 7,424,616 B1 | 9/2008 | Brandenburg et al. |
| 7,461,250 B1 * | 12/2008 | Duane et al. .................. 713/157 |
| 7,797,452 B2 * | 9/2010 | Christensen et al. ......... 709/246 |
| 8,122,263 B2 | 2/2012 | Leichsenring et al. |
| 8,214,639 B2 | 7/2012 | Leichsenring et al. |
| 2001/0011255 A1 | 8/2001 | Asay et al. |
| 2001/0020228 A1 | 9/2001 | Cantu et al. |

(56) References Cited

U.S. PATENT DOCUMENTS

| | | | |
|---|---|---|---|
| 2001/0034724 | A1 | 10/2001 | Thieme |
| 2002/0007346 | A1 | 1/2002 | Qiu et al. |
| 2002/0029194 | A1 | 3/2002 | Lewis et al. |
| 2002/0029200 | A1 | 3/2002 | Dulin et al. |
| 2002/0029337 | A1 | 3/2002 | Sudia |
| 2002/0029350 | A1 | 3/2002 | Cooper et al. |
| 2002/0046188 | A1 | 4/2002 | Burges et al. |
| 2002/0059143 | A1 | 5/2002 | Frankel |
| 2002/0065695 | A1 | 5/2002 | Francoeur et al. |
| 2002/0095579 | A1 | 7/2002 | Yoshiura et al. |
| 2002/0112156 | A1 | 8/2002 | Gien et al. |
| 2002/0124172 | A1 | 9/2002 | Manahan |
| 2002/0128940 | A1 | 9/2002 | Orrin et al. |
| 2002/0129248 | A1 | 9/2002 | Wheeler et al. |
| 2004/0111379 | A1 | 6/2004 | Hicks et al. |
| 2004/0187031 | A1 | 9/2004 | Liddle |
| 2005/0114666 | A1 | 5/2005 | Sudia |
| 2005/0132229 | A1 | 6/2005 | Zhang et al. |
| 2006/0004670 | A1 | 1/2006 | McKenney et al. |
| 2007/0073621 | A1 | 3/2007 | Dulin et al. |
| 2008/0010665 | A1 | 1/2008 | Hinton et al. |
| 2009/0100261 | A1 | 4/2009 | Aoshima |

FOREIGN PATENT DOCUMENTS

| | | |
|---|---|---|
| JP | 2007-045622 | 2/2007 |
| JP | 2007-110377 | 4/2007 |
| JP | 2009-086802 | 4/2009 |
| WO | WO 96/31965 | 10/1996 |
| WO | WO 98/26386 | 6/1998 |
| WO | WO 99/22291 | 5/1999 |
| WO | WO 00/45564 | 8/2000 |
| WO | WO 00/67143 | 11/2000 |
| WO | WO 01/18717 A1 | 3/2001 |
| WO | WO 2006/085647 | 8/2006 |
| WO | WO 2007/011637 | 1/2007 |
| WO | 98/26385 A3 | 4/2010 |

OTHER PUBLICATIONS

"Acceptance of Signature Guarantees From Eligible Guarantor Institutions", 56 Fed. Reg. 18380, (Apr. 22, 1991).

"Acceptance of Signature Guarantees From Eligible Guarantor Institutions", 56 Fed. Reg. 46748, (Sep. 16, 1991) (to be codified at 17 CFR pt. 240).

Aiken, Peter et al., Microsoft Computer Dictionary, Microsft Press, 5th Edition, p. 290.

ARIN—Certificate Authority: https://ca.arin.net/pup/arin_ca_request.html; date unknown (before Jul. 20, 2006).

Aslam, Taimur, Protocols for e-commerce: including related article on BlueMoney commerce model, Dr. Dobb's Journal, Dec. 1998.

"Baltimore Announces Support for Identrus, the Global Trust Organization", Business Wire, New York: Apr. 12, 1999, p. 1, Proquest #40459204, 3 pages.

Banking Bulletin from Christopher M. Cross, Deputy Comptroller for Compliance, Comptroller of the Currency Administrator of National Banks, to national Banks Registered as a Transfer Agent, District Deputy Comptrollers, Department and Division Heads, and all Examining Personnel, Re: Adoption of New Transfer Agent (Feb. 12, 1992).

Biddle, C. Bradford, "Comment, Misplaced Priorities: The Utah Digital Signature Act and Liability Allocation in a Public Key Infrastructure", San Diego Law Review 33, 1143, 1996.

Breedon, Richard C., Chairman, U.S. Securities and Exchange Commission, Letter to The Honorable Jake Gam, Senate Banking, Housing, and Urban Affairs Committee (Mar. 6, 1990).

Brown-Humes, Christopher, and Graham, George, "Banks join forces to provide guarantees on internet trading", Financial Times, London, UK: Apr. 12, 1999, p. 20, Proquest #40448447, 3 pages.

Brown, Mark R., "Special Edition Using Netscape 2" 1995. 2nd Edition, p. 287,288, 876-879.

"Entrust Technologies Supports Newly Formed Identrus Organization", Business Wire, New York: Apr. 12, 1999, p. 1, Proquest #40463049, 3 pages.

Guttman, Egon, Professor of Law, The American University, Washington College of Law, letter to Jonathan G. Katz, Esq., Secretary to the Securities and Exchange Commission, Re: Securities Exchange Act Release No. 34-29663 Notice of Proposed Rule Making, new Rule 17 Ad-15 File No. 57-27-91 (Oct. 28, 1991).

Hallam-Baker, Phillip M., Micro Payment Transfer Protocol (MPTP), Ver. 0.1, W3C Working Draft, at http://www.w3.org/pub/WWW/TR/WD-mptp-951122 (Nov. 22, 1995).

Hallerman, David, "Will Banks Become E-Commerce Authorities?", Bank Technology News, New York: Jun. 1999, vol. 12, Issue 6, p. 1; Proquest 42664468, 8 pages.

"Identrus begins pilot, Bits Opens Doors to Lab"Corporate EFT Report, Potomac, Jul. 21, 1999, vol. 19, Issue 14;p. 1; Proquest #43335701, 2 pages.

Jueneman, Robert R., of GTE laboratories, "E-mail to Mike Roe and Warwick Ford, re: User Key Material Proposal", Sep. 8, 1994, 5:49 EDT) (ftp://ftp.tis.com/pub/pem-dev/archive).

Jueneman, Robert R., of GTE laboratories, "E-mail to Peter Willimas, Verisign, re: Certificate hierarchies and SEPP/STT concepts, part 2", Oct. 13, 1995, 17:49 EDT) (ftp://ftp.tis.com/pub/pem-dev/archive).

Jueneman, Robert R., of GTE laboratories, "E-mail to Phill Hallam, W3C, re: Nonrepudiation and CA Liabilities", Oct. 16, 1995, 15:54 EDT) (ftp://ftp.tis.com/pub/pem-dev/archive).

Jueneman, Robert R., of GTE laboratories, "E-mail to Hal Finney, re: Nonrepudiation and CA liabilities", Oct. 19, 1995, 15:31 EDT) (ftp://ftp.tis.com/pub/pem-dev/archive).

Kaner, Cem, The Insecurity of the Digital Signature, at http://www.badsoftware.com/digsig.htm (Sep. 1997).

Kutler, Jeffrey, "ABA's Certificate Venture Aims to Give Banks the Lead in Secure Net Payments," American Banker, New York, NY: May 14, 1999, vol. 164, Issue 92; p. 1; Proquest #41354786, 3 pages.

Linehan, Mark & Gene Tsidik, Internet Keyed Payments Protocol (iKP), at http://www.zurichibm.com/Technolo.../ecommerce/draft-tsudik-ikp-00.txt (Jul. 1995).

Marketing Brochure, Securities Transfer Agent Medallion Program (1991).

MasterCard Int'l Inc. Operations Manual §§ 5.11-5.14 (Nov. 1993).

Merrill, Charles R., "An Attorney's Roadmap to the Digital Signature Guideline", in 1318 Lecture Notes in Computer Science 291, 291-297 (Rafael Hirschfield ed. 1997).

Mitchell, C.J. et al., Contemporary Cryptology: The science of Information Integrity pp. 325-378 (Simmons ed., IEEE Press, 1992).

Pamatatau, Richard, "CA anticipates a secure e-commerce infrastructure", Dominion, Wellington, New Zealand, Jul. 26, 1999, P.IT. 8, Proquest #43762280, 3 pages.

Pfitzmann, Birgit, "Digital Signatures Schemes", 1100 Lecture Notes in Computer Science (Goss et al. eds. 1996).

Schapiro, Mary L., "Clarifying Elimination of Stock Certificates", Wall Street Journal, Jan. 17, 1991.

SET: Secure Electronic Transaction Specification, May 31, 1997, Version 1, pp. 1-619.

Solomon, Howard, "Canadian banks vault into e-com identity service", Computing Canada, Jun. 4, 1999, v25i22pg23; Proquest #42244579, 3 pgs.

STAMP Initiative Receives Support from SEC, STA Newsletter (The Securities Transfer Association, Inc.), Jun. 30, 1990, at 1, 4.

"ValiCert Selected as Validation Technology for Identrus' Global Business to Business E-Commerce Pilot", PR Newswire, New York: Jul. 12, 1999, p. 1; Proquest #43079343, 3 pages.

Patent Cooperation Treaty, "PCT International Search Report", issued for PCT/US00/24661, mailed Jan. 25, 2001.

Patent Cooperation Treaty, "PCT International Search Report", issued for PCT/US00/24607, mailed Jan. 9, 2001.

Patent Cooperation Treaty, "PCT International Search Report", issued for PCT/US02/12947, mailed Jun. 21, 2002.

Patent Cooperation Treaty, "PCT International Search Report", issued for PCT/US01/25389, mailed Nov. 23, 2001.

Patent Cooperation Treaty, "PCT International Search Report", issued for PCT/US01/28275, mailed Dec. 31, 2001.

(56) References Cited

OTHER PUBLICATIONS

Patent Cooperation Treaty, "PCT International Search Report", issued for PCT/US01/28277, mailed Dec. 14, 2001.
Patent Cooperation Treaty, "PCT International Search Report", issued for PCT/US01/28278, mailed Dec. 3, 2001.
Patent Cooperation Treaty, "PCT International Search Report", issued for PCT/US00/24662, mailed Jan. 23, 2001.
Patent Cooperation Treaty, "PCT International Search Report", issued for PCT/US00/24663, mailed Dec. 29, 2000.
Patent Cooperation Treaty, "PCT International Search Report", issued for PCT/US01/25388, mailed Nov. 19, 2001.
Patent Cooperation Treaty, "PCT International Search Report", issued for PCT/US00/03552, mailed Jun. 13, 2000.
Patent Cooperation Treaty, "PCT International Search Report", issued for PCT/US00/03550, mailed May 2, 2000.
Patent Cooperation Treaty, "PCT International Search Report", issued for PCT/US00/24606, mailed Jan. 17, 2001.
Patent Cooperation Treaty, "PCT International Search Report", issued for PCT/US00/24608, mailed Dec. 8, 2000.
European Patent Office, Supplementary European Search Report for EP 00961672, Munich Germany, Jun. 12, 2009.
Sugiyama, "Investigation in the USA on Authentication Business in Financial Institution", The Center for Financial Industry Information Systems (FISC), No. 205, pp. 50-62, Sep. 1, 1998.
Japanese Patent Office, Office Action issued in Patent Application JP 2001-526778, on Feb. 10, 2010.
Patent Cooperation Treaty, "PCT International Search Report", issued for PCT/US09/00357, mailed Mar. 24, 2009.
Apectel, "Achieving PKI Interoperability", Pebble Teo National Computer Board Singapore, printed on Jan. 17, 2008, found at: www.apectelwg.org.
APKI-F, "Asia PKI Interoperability Guidelines (Version 1.0)", Asia PKI Forum Interoperability Working Group, Mar. 2004.
Elley, Yassir et al., "Building Certification Paths: Forward vs. Reverse", Proc. 2001 Network and Distributed System Security Symposium, Feb. 8-9, 2001, San Diego, CA.
FBCA, "Welcome to the Federal Bridge Certification Authority", printed on Jan. 28, 2008, found at: http://cio.gov/fbca/.
Fisher, James L., "Side-Effects of Cross-Certification", 4$^{th}$ Annual PKI R&D Workshop, Apr. 19-21, 2005, Gaithersburg, MD.
Hesse, Peter & David P. Lemire, "Managing Interoperability in Non-Hierarchical Public Key Infrastructures", Proc. 2001 Network and Distributed System Security Symposium, Feb. 8-9, 2001, San Diego, CA.
SAFE BioPharma Assoc., Web pages describing the SAFE product, printed on Jan. 29, 2008, found at http://www.safe-biopharma.org.
Verisign, Web pages describing Verisign's: Products and Services, Solutions, Support, About Verisign, and Existing Customers, printed on Jan. 28, 2008, found at: http://www.verisign.com.
Wells Fargo, "WellsSecure Trusted Identity Service" and link "WebTrust Certification", printed on Jan. 28, 2008, found at: https://www.wellsfargo.com/biz/products/wellssecure/.
Australian Office Action dated Dec. 17, 2012 in corresponding Application No. AU 2009205675, 3 pages.
Japanese Office Action dated May 28, 2013 in corresponding Application No. JP 2010-543151 in English and Japanese, 7 pages.
Japanese Unexamined Patent Application Publication No. 2003-030358 English Abstract, published Jan. 31, 2003, 1 page.
Japanese Unexamined Patent Application Publication No. 2007-045622 English Abstract, published Feb. 22, 2007, 1 page.
Japanese Unexamined Patent Application Publication No. 2007-110377 English Abstract, published Apr. 26, 2007, 1 page.
Japanese Unexamined Patent Application Publication No. 2009-086802 English Abstract, published Apr. 23, 2009, 2 page.
European Communication and Supplementary European Search Report dated Jul. 27, 2012 in corresponding European Application No. EP 09702248, 8 pages.
Telecommunications Security; Trusted Third Parties (TTP); Specification for TTP services; Part 1: Key management and key escrow/recovery, 1998, pp. 1-23, No. V1.1.1.

\* cited by examiner

End-Entity Qualified Business Identity Hardware Certificate Profile

| Field | Content | Mandatory | Critical |
|---|---|---|---|
| 1. X.509v1 Field | | | |
| 1.1. Version | v3 | y | |
| 1.2. Serial Number | Allocated automatically by the Issuing CA | y | |
| 1.3. Signature Algorithm | SHA-1 with RSA Signature | y | |
| 1.4. Issuer Distinguished Name | | y | |
|     1.4.1. Country (C) | Not Required | n | |
|     1.4.2. Organization (O) | e.g., "Bank XYZ" | y | |
|     1.4.3. Organizational Unit (OU) | e.g., "Bank XYZ Identrus Authority" | y | |
|     1.4.4. Common Name (CN) | e.g., "Bank XYZ Identrus Authority" | y | |
| 1.5. Validity | | y | |
|     1.5.1. Not Before | e.g., "00:00:01 01 September 1999" | y | |
|     1.5.2. Not After | e.g., "23:59:59 31 August 2003" | y | |
| 1.6. Subject | | y | |
|     1.6.1. Country (C) | Required | y | |
|     1.6.2. Organization (O) | e.g., "The XYZ Company" | y | |
|     1.6.3. Organizational Unit (OU) | e.g., "International Financial Services" | y | |
|     1.6.4. Common Name (CN) | e.g., "John Doe" | y | |
| 1.7. Subject Public Key Info | 1024-Bit Public key encoded in accordance with RFC 3280 & PKCS#1 | y | |
| 2. X.509v3 Extensions | | | |
| 2.1. Authority Key Identifier | | y | n |
|     2.1.1. Key Identifier | the Subject Key Identifier of the Issuer of this Certificate | y | |
|     2.1.2. AuthorityCertIssuer | Not present | n | |
|     2.1.3. AuthorityCertSerialNumber | Not present | n | |

FIG. 1A

| Field | Content | Mandatory | Critical |
|---|---|---|---|
| 2.2. Subject Key Identifier | The keyIdentifier is composed of the 160-bit SHA-1 hash of the value of the BIT STRING subjectPublicKey (excluding the tag, length, and number of unused bits). | y | n |
| 2.3. Key Usage | | y | Y |
|    2.3.1. Digital Signature | Not selected "0" | y | |
|    2.3.2. Non Repudiation | Selected "1" | y | |
|    2.3.3. Key Encipherment | Not selected "0" | y | |
|    2.3.4. Data Encipherment | Not selected "0" | y | |
|    2.3.5. Key Agreement | Not selected "0" | y | |
|    2.3.6. Key Certificate Signature | Not selected "0" | y | |
|    2.3.7. CRL Signature | Not selected "0" | y | |
| 2.4. Certificate Policies | | y | n |
|    2.4.1. Policy Identifier | 1.2.840.114021.1.30.2 plus any BankXYZ Policy Identifiers | y | |
|    2.4.2. Policy Qualifier ID | 1.3.6.1.5.5.7.2.2 | y | |
|       2.4.2.1. User Notice | This Certificate may be relied upon only by either: (1) a Relying Customer of an Identrus Participant, or (2) a party bound to the alternative policy regime specified elsewhere in this Certificate | y | |
|       2.4.2.2. Policy Identifier | Optional Policy Identifiers to be defined by Participant | n | |
|       2.4.2.3. Policy Qualifier ID | 1.3.6.1.5.5.7.2.2 | n | |
|       2.4.2.4. User Notice | Optional to be defined by Participant | n | |
| 2.5. Subject Alternate Names | Optional | n | n |
|    2.5.1. rfc822Name | e.g., "john.doe@XYZCorp.com" | y | |
|    2.5.2. registeredID | Optional, "OID as per IP-NAMOID" | n | |
| 2.6. Basic Constraints | Not present | n | |
|    2.6.1. Subject Type | Not present | n | |
|    2.6.2. Path Length Constraint | Not present | n | |

FIG. 1B

| Field | Content | Mandatory | Critical |
|---|---|---|---|
| 2.7. Authority Information Access | | y | N |
| 2.7.1. Access Description | | y | |
| 2.7.1.1. Access Method | On-line Certificate Status Protocol(1.3.6.1.5.5.7.48.1) | y | |
| 2.7.1.2. Alternative Name | e.g., "URL=https://IV.OCSP.Bank-XYZ.com" | y | |
| 2.7.2. Access Description | | | |
| 2.7.2.1. Access Method | IdenTrust Certificate Status Check Protocol(1.2.840.114021.4.1) | y | |
| 2.7.2.2. Alternative Name | "URL=https://xyz.abcBank.com" | y | |
| 2.8. CRLDistributionPoint | | n | |
| 2.9. QC Statements | | n | n |

FIG. 1C

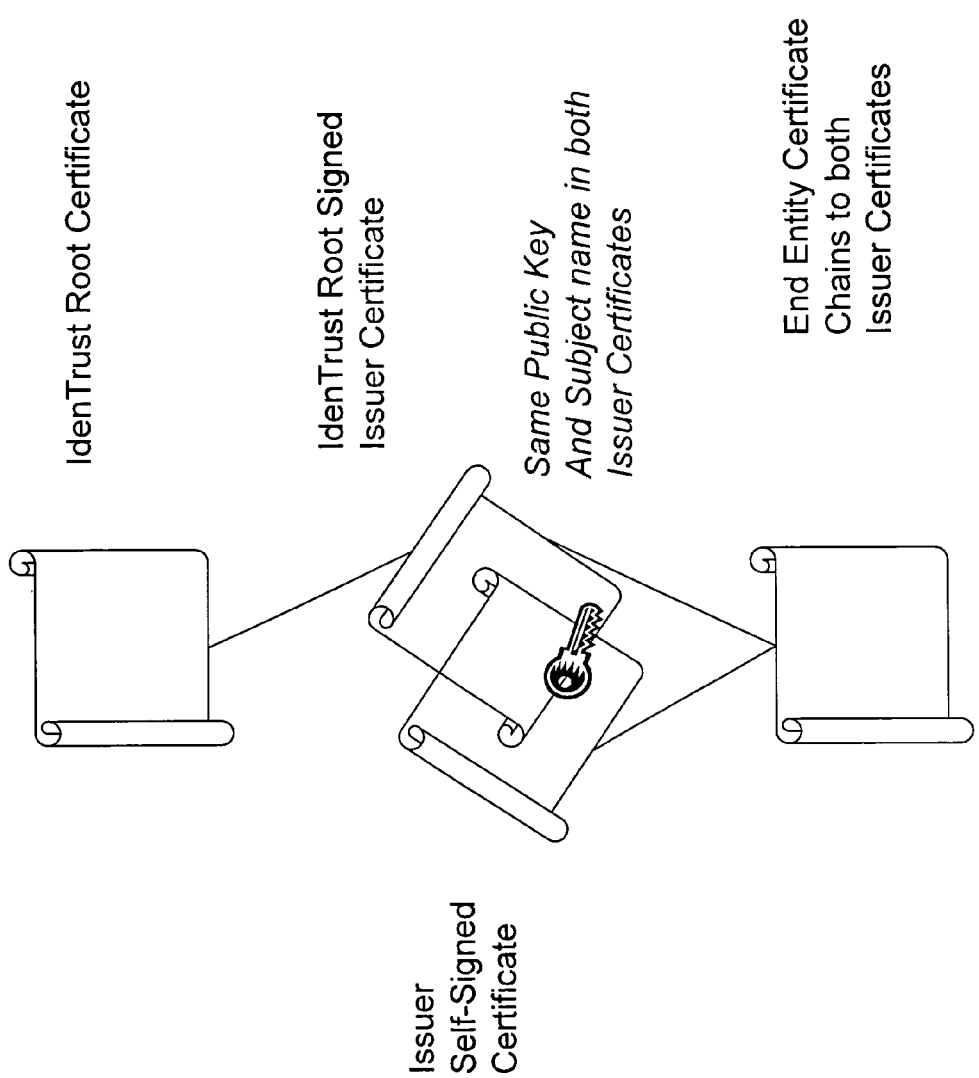

BINDING A DIGITAL CERTIFICATE TO MULTIPLE TRUST DOMAINS

RELATED APPLICATION

The present patent application claims the benefit of, and incorporates by reference, U.S. provisional patent application 61/011,668 filed Jan. 18, 2008, entitled "Binding a Digital Certificate to Multiple Trust Domains".

TECHNICAL FIELD

This invention pertains to the field of public key infrastructures, digital certificates, and public key cryptography.

BACKGROUND ART

Traditionally, digital certificates have been issued within a trust domain "silo" governed by a legal regime presumed to be uniform. Methods involving cross-certification between such trust domains through the use of policy mapping and a bridge certificate authority have permitted a certificate issued within one trust domain to be relied upon in another.

Another approach is to design a hierarchic Public Key Infrastructure in which a Root Certificate Authority ("Root CA") authorizes Subordinate Certificate Authorities ("Sub-CAs") to issue end entity certificates that can be relied upon by any other end entity authorized by Sub-CAs of the Root. One implementation of a hierarchic PKI is the IdenTrust System, which constitutes a single, uniform, trust domain with end entity certificates issued by a global network of Sub-CAs of the IdenTrust Root CA, all operating under uniform standards, policies, procedures and rules.

The motivation for the invention was to allow end entity certificates created for use within the IdenTrust System also to be used outside the System, in another trust domain, about which more below.

Most PKI systems are "open" in the sense that they: (1) rely upon local, public, law governing the making and reliance upon digital signatures and the validity of digital certificates used to authenticate them; (2) seek to bind a relying party to terms of use, substantially more specific than those of local law, via a Certificate Policy ("CP") and/or Certification Practices Statement ("CPS") typically posted on a web site pointed to by a URL embedded in the certificate, which a relying party is deemed to have accepted in virtue of the fact of reliance upon the certificate, in a manner analogous to "shrink-wrap licenses" in the world of software; and (3) rely upon methods of certificate validation that can be performed by any member of the public. Such open systems rely in part on public, local law, and in part on the presumed enforceability of the CP or CPS against the relying party, who is not in fact contractually bound to them.

The IdenTrust System is a closed contractual system, in which every subscriber and relying party is bound to a customer agreement which contractually specifies the rules under which digital signatures are agreed to be made and relied upon and the digital certificates are agreed to be valid. Local, external, public law, such as that governing sovereign recognition of digital signatures and digital certificates in any particular jurisdiction is viewed as irrelevant to the closed contractual system, so long as the customer agreements are locally enforceable, which is determined through legal analysis when the certificates are to be offered in a new jurisdiction. The certificate architecture of the system reinforces its contractual structure: a person seeking to rely upon a certificate issued within the system can do so only after receiving a positive response to a certificate validation request the party seeking to rely has digitally signed with a private key he possesses solely by virtue of being bound to a customer agreement with a Participant.

The IdenTrust System is a hierarchic PKI in which the IdenTrust Root CA licenses uniform policies, procedures, and technological specifications to its Participant financial institutions, binds them to uniform rules, and requires that their customer agreements contain uniform terms. The IdenTrust Root CA issues certificates to its participant financial institutions (each a "Participant"), whose Sub-CAs of the Root, in turn issue end entity certificates to individual certificate holders employed by customers of the Participants. Because of the uniformity of the rules and procedures throughout the system, every certificate issued by the Sub-CA of any Participant is as reliable and trustworthy as any other certificate issued by the Sub-CA of any other Participant, even if the Participants or the customers are in different countries governed by different laws.

However, local customers often want to possess, or to rely upon, certificates issued under some local policy regime. For example, certificates that are "Qualified" under the law of a European country that complies with the EU Digital Signature Directive are often commercially preferred for certain purposes in such a country. Often such certificates can be validated via a method open to the public, such as via reference to a Certificate Revocation List generated by the CA and posted on its web site or accessible through a distribution point identified in the certificates. Accordingly, it is advantageous to the CA to be able to issue certificates that can be used both within the contractual, global system, such as the IdenTrust System, and outside it under applicable local law. Such dual use is both internal to the closed IdenTrust System at one moment of reliance and "External Use" under the alternate trust domain at another moment of reliance.

Certificates to be used for a specific purpose are typically issued within a designated trust domain. In one deployment, for example, certificates issued to certain government employees were required to be issued under the Certificate Policy applicable to that trust domain. Use of the invention permitted the issuance to said employees of IdenTrust certificates each such person could use for dual purposes, such as both access to government buildings and for electronic banking.

The operation of a PKI, and the distribution of digital credentials, readers and associated software and hardware can be expensive. It is highly advantageous to a CA, and to its subscribers and relying parties, to permit its certificates to be issued from a single platform and on a single token, but used or relied upon in multiple trust domains. This spreads the cost of the infrastructure investment across all of the trust domains and the applications that may be specific to each of them.

Accordingly, a need arose to develop a method by which a given certificate could be alternately bound to more than one policy regime (or legal, regulatory, or contractual structure) in different trust domains, at the election of the relying party at the time of reliance. This method can be generalized to any alternative trust domains.

It is crucial that there never be any doubt as to which trust domain is being bound to the certificate at any given moment of reliance. Such domains often have varying rules governing liability, recourse, and dispute resolution, and ambiguity as to which rules govern reliance upon a multi-domain certificate at any moment would be fatal to interoperability of the certificate across the trust domains. The invention assures that one and only one trust domain is bound to a certificate at any given moment by requiring that the relying party, at the moment of reliance, use a certificate validation mechanism unique to that trust domain, and thereby demonstrate its choice of the associated policy regime.

An alternative means of using a certificate in multiple trust domains that has been widely deployed in the prior art is the use of a bridge. A bridge is intended to connect the silos of multiple trust domains like a causeway connecting islands. A bridge comprises a Certificate Authority that issues "cross-certificates" to other CAs and receives corresponding cross-certificates from such CAs so that a relying party in one trust domain can rely upon a certificate issued by a CA in another. Thus, if a relying party has CA #1 as its trust anchor, and wishes to rely upon a certificate issued by CA #2, if the bridge CA has exchanged cross-certificates with CAs #1 and #2, then the relying party whose trust anchor is CA #1 can trust CA #2 as an alternate trust anchor, and vice versa. In an architecture relying upon certificate path discovery and validation, the cross-certificates permit the relying party in question to discover the certificate path between the subscriber's certificate (issued by CA#2) and the relying party's ultimate trust anchor, CA #1. The cross-certification process typically requires a painstaking, and therefore expensive, mapping of the certificate policies of each of the cross-certified CAs to those of the bridge CA (to determine whether they meet common standards), as well as contracts between each CA and the Bridge CA establishing certain common understandings. Problems of cross-certification can include "transitive trust," which can extend the opportunity of reliance upon a certificate to unintended relying parties. See, e.g., Fisher, James L., Side-Effects of Cross-Certification, http://middleware.internet2.edu/pki05/proceedings/fisher-cross-_cert.pdf. The invention permits a single certificate to be trusted in multiple trust domains without policy mapping or cross-certificates, and permits a closed system to remain closed, regardless of the reliance upon the same multi-domain certificates outside the closed system.

DISCLOSURE OF INVENTION

The present invention includes a public key infrastructure comprising a participant that issues digital certificates. Each digital certificate can be relied upon in at least two different trust domains. The public key infrastructure does not employ policy mapping between or among the trust domains. Furthermore, the public key infrastructure does not link any pair of trust domains via cross-certificates.

BRIEF DESCRIPTION OF THE DRAWINGS

These and other more detailed and specific objects and features of the present invention are more fully disclosed in the following specification, reference being had to the accompanying drawings, in which:

FIGS. 1A-1C (collectively FIG. 1) illustrate an exemplary digital certificate that can be used in the present invention.

FIG. 2 is a system level diagram of a first embodiment for implementing the present invention.

DETAILED DESCRIPTION OF THE PREFERRED EMBODIMENTS

Figure 3:
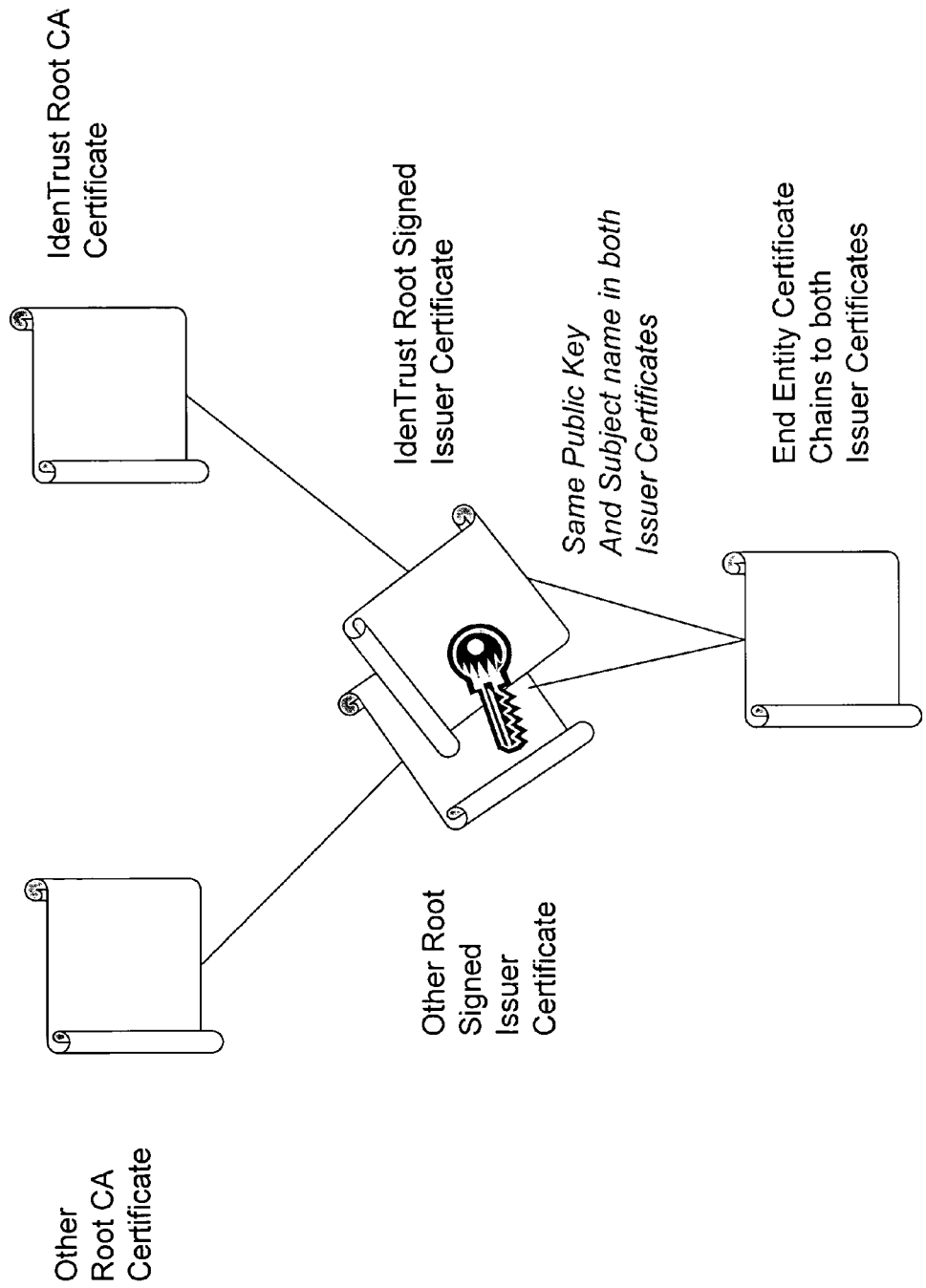
FIG. 3 is a system level diagram of a second embodiment for implementing the present invention.

The invention consists of the following elements.

Two distinct policy regimes—Use of a certificate alternately in either of two trust domains, each with its own policy regime, such as the IdenTrust rules, on the one hand, and an alternative regime, such as a local comprehensive law governing the use of digital certificates to authenticate digital signatures in a particular jurisdiction, on the other. The alternate regime could just as well be the rules of another closed system. Such regimes contain mandatory rules governing such crucial matters as the relying party's recourse, the CA's potential liability, the kinds and maximum amounts of recoverable damages, and the procedures for lodging claims and resolving disputes, as well as the procedures for identifying subscribers, the security of keys and tokens, etc.

Two policy OIDs—Each of the two policy regimes to which the end entity certificate is alternately to be bound must be uniquely identified by a Object Identifier ("OID") that refers to one of them. For the IdenTrust regime, that includes the applicable customer agreement, all documents incorporated therein by reference, and the public law under which the agreement is enforced. For the alternate regime, it may include a CP, CPS, and the public law under which digital signatures are locally enforceable and digital certificates are locally valid.

Interoperable certificates—IdenTrust and many other PKIs use X.509 certificates, but there are many implementations of such certificate profiles. The respective end entity certificate profiles required by the two trust domains must be such that a certificate implementing both profiles is truly interoperable in either domain, meaning that certificate processing by an application or validation utility will not fail for either of the two validation mechanisms used for the same certificate. Where processed certificate fields that conventionally contain only one data element, such as a policy Object Identifier ("OID") or an Authority Information Access ("AIA") extension, contain two such elements to permit alternative certificate processing capabilities, care must be taken to test the certificates and configure the certificate processing software to permit processing of all required alternative elements without failure.

Two Distinct validation mechanisms—When a given certificate can be validated by two distinct methods, the certificate processing software must be directed by the relying party uniquely to choose only one such method for certificate validation processing for a particular event of reliance. The key is that validation through either mechanism must be possible, but in any particular case, only one of them is selected and used. For example, a given multi-domain certificate may be validated via a signed validation request made via the Online Certificate Status Protocol ("OCSP"), or alternately by reference to a publicly posted Certificate Revocation List ("CRL") issued by the CA. Use of different validation mechanisms for each trust domain assures that success in certificate processing will have resulted from a choice made by the relying party at the time of reliance as to which certificate validation method to employ. The relying party's choice of certificate processing method displays its choice of trust domain, and consequently, its choice of which policy regime, and which rules, to govern that event of reliance.

Two Issuer Certificates—Each of the end entity certificates contains an Issuer name field that names the Participant whose CA issued the certificate. Each of those certificates chains to two Issuer certificates, each with the same name in the Issuer name field, that of the Participant, and each containing the same public key corresponding to the private certificate signing key used by the CA to sign the end entity certificates. One of those Issuer certificates is used within the closed IdenTrust System, and the other is used for External Use, in the alternative trust domain. Both such issuer certificates contain the same public key and are signed by the same private key.

Two Trust Anchors—Many certificate processing methods, such as those using CRLs, rely upon processes of first discovering the certificate path between the Trust Anchor of the relying party and that of the CA that issued the certificate to be relied upon, and then validating each of the certificates in the path. If the method of the invention is employed in a system relying upon path discovery for both policy regimes, a separate Trust Anchor is necessary for each of them.

The risks entailed by the policy regime of the alternative trust domain must be acceptable to the CA—Simply that the CA must be willing to accept whatever risks are attendant to issuing certificates under the policy regime that is alternative to the CA's primary trust domain. For a Participant in the closed contractual IdenTrust system, that typically means accepting the risk that the relying party will not have been enforceably bound to a relying party agreement, and thus that the Participant may not be able to enforceably limit its liability to the relying party under the law applicable to the policy regime of the alternative trust domain.

The elements outlined above mention two distinct alternative trust domains. It is theoretically possible to issue a single certificate that is interoperable in more than two trust domains. The current realities of certificate processing (including the processing of multiple OIDs and AIAs in certificate fields) and the current lack of apparent practical demand for many more than a few trust domains for a single certificate, would appear to argue against seeking to turn the "two sided coin" into a game of "pin the tail on the donkey." One goal of the IdenTrust system is to obviate such an identity "tower of Babel" by creating in the IdenTrust System a common interoperable standard for identity credentials worldwide. The present invention then permits credentials issued within that uniform, global, closed system also to be relied upon locally under the local legal regime where the relying party happens to be located.

Three embodiments of this approach have been implemented to date. They are described below as a basic method, plus two variations.

In one embodiment of the invention, FIG. 1 is a certificate profile that has been configured to be interoperable under both the trust domain of the IdenTrust System and that applicable to a "Qualified Certificate" under the trust domain of the Directive 1999/93/EC of the European Parliament and of the Council of 13 Dec. 1999 on a Community framework for electronic Signatures ("Directive on Electronic Signatures") regulations promulgated thereunder, and national implementing legislation.

According to the method of the invention, field 2.4.1 of FIG. 1 specifies two policy OIDs, one specifically, the other by description. The first, represented by a string of numbers, is an OID that identifies the Identity Certificate Policy of an IdenTrust Participant, and it incorporates the balance of the policy regime applicable to reliance upon that certificate within the IdenTrust System, i.e. the applicable Customer Agreement, the external law under which the customer agreement is enforced against the customer who relies upon it, and the specifications governing the method required to validate the Certificate when it is relied upon within the IdenTrust System (which are incorporated by reference into the Customer Agreement.)

The remaining language in field 2.4.1, "plus any bank xyz Policy Identifiers," describes another OID that is inserted into the Certificate by the IdenTrust Participant whose CA issues it, that refers to the alternate policy regime governing the certificate when it is relied upon in the other trust domain, in this case, the CP and CPS of the Participant governing its reliance outside the IdenTrust System, and applicable law and regulations of the local country.

Following industry practice, IdenTrust requires its Participants to include in an end entity certificate a User Notice specifying information of which potential relying parties are to take note. It is represented in field 2.4.2.1, and states, "[t]his Certificate may be relied upon only by either: (1) a Relying Customer of an Identrus Participant, or (2) a party bound to the alternative policy regime specified elsewhere in this Certificate." The first clause governs the use of the Certificate within the IdenTrust System, the second governs its use under the alternate policy regime, of which the reference of the phrase "elsewhere in this Certificate" is the phrase "any bank xyz Policy Identifiers" in field 2.4.1.

IdenTrust specifications require that customers of Participants who wish to rely upon an IdenTrust certificate, such as to verify a digital signature or control access to systems or premises, shall verify the signature and validate the certificate according to IdenTrust specifications, which include the following specific, mandatory, requirements applicable when the certificates are used within the IdenTrust System:

1. The signature must be verified using the signer's IdenTrust certificate and the relying customer's software conforming to proprietary IdenTrust requirements;

2. the certificate must be validated via signed messages created by the relying customer with software conforming to proprietary IdenTrust requirements and sent in encrypted form via the OCSP to the Participant with which the relying customer has contracted to obtain its own certificates (used to validate the relying customer's signatures on the validation requests); and 3. the messaging flow of the OCSP validation requests and responses is directed according to proprietary IdenTrust requirements not compliant with ETF RFC 3280.

For purposes of the disclosure represented by the present application, the essential point is that the procedures required by IdenTrust specifications governing certificate validation are both very specific and unique. They are designed to assure that a relying party must also be a customer of an IdenTrust Participant, bound to its customer agreement governing all use of the relying party's key pair, assuring that the relying party is a relying customer, not an interloper. Validation of a signer's IdenTrust certificate in the fashion required by IdenTrust rules and specifications is contractually required by the customer agreement for the signer to be bound to the signature, and validation in any other manner is not authorized use within the IdenTrust System, but may be authorized and legally effective under the alternate trust domain if the latter's requirements are met at the time of reliance.

IdenTrust requirements permit a Participant to specify the address of its OCSP responders either with a "hard coded" IP address or via an Authority Information Access "AIA" extension. See Field 2.7 et. seq. in FIG. 1. Field 2.7.1.1 specifies that the access method is to be via OCSP, and field 2.7.1.2 states its name as a URL. Together, those two fields uniquely specify the way to address an OCSP certificate validation request to the Participant's CA that issued the certificate for use within the closed IdenTrust System. The data in the fields under 2.7.2 are proprietary and not currently in use; these fields specify communications with an IdenTrust Transaction Coordinator.

Field 2.8 is the field in which a Participant wishing to permit External Use of the certificate enters the address of a distribution point for a Certificate Revocation List. This CRL is used to validate the certificate by a relying party wishing to rely upon the certificate under the alternative policy regime of the other trust domain, in this case, the CP and CPS of the Participant governing its reliance outside the IdenTrust System, and applicable law and regulations of the local country.

It is important to note that IdenTrust rules prohibit the use of CRL distribution points in certificates intended to be used solely within the IdenTrust System, as such certificates are permitted to be validated only via signed OCSP, to prevent parties who lack IdenTrust key pairs tied to an IdenTrust customer agreement from obtaining their validation status.

The two certificate validation mechanisms discussed above represent the choice to be made by the relying party at the moment of reliance. In this embodiment, if validation is made via signed OCSP to an AIA extension specified as required under IdenTrust rules, the certificate is bound at that moment to the policy regime of the IdenTrust trust domain. If validation is made via reference to a public CRL, and via conventional path discovery and validation, the certificate is at that moment bound to the policy regime of the alternative trust domain.

It is critical that a certificate to be alternately bound to two different trust domains can successfully validate in each of them. To assure that validation in the alternate domain is successful, all of the elements and steps required for successful validation within that domain must be possible. Thus, for example, in a trust domain that requires certificate path discovery to an external trust anchor, and path validation to a CRL it has posted, an external trust anchor will be necessary to serve as the terminus of the validation path or validation will fail.

1st Embodiment

Self-Signed Issuer Certificate. (FIG. 2)

A Participant's CA possesses a certificate signing private key that corresponds to a public key. In the standard deployment within the IdenTrust System, the IdenTrust Root CA issues Issuer certificates containing that public key of the Participant, and naming the Participant in its subject name fields. When the Participant's CA issues end entity certificates, those certificates name the Participant in their Issuer name fields and the Subscriber in their subject name fields. (See fields 1.4.2 and 1.6.2 in FIG. 1, respectively). The trust anchor for such certificates is the IdenTrust Root CA certificate. As discussed above, a party wishing to rely upon such an end entity certificate within the IdenTrust System must be a customer of an IdenTrust Participant, who possesses a key pair solely by virtue of being bound to an IdenTrust customer agreement with that Participant, and who must use its private key to sign, and its own end entity certificate to authenticate, the certificate status request it must send to its Participant via signed OCSP to validate the certificate of the subscriber.

In the first embodiment, when an end entity certificate issued to an IdenTrust subscriber is also to be used outside the IdenTrust System, for External Use, the CA of the Participant issues a second, "self-signed" Issuer certificate to itself, naming the Participant in both the Issuer and subject name fields, and containing the same public key that is contained in the Issuer certificate described in the preceding paragraph. An end entity certificate signed by the Participant's private certificate signing key can be verified by the public key in both Issuer certificates. If a party wishes to rely upon the end entity certificate is an IdenTrust customer, it will validate the certificate in the manner described in the preceding paragraph. If a party wishes to rely upon the end entity certificate through External Use under an alternative policy regime, such as one provided under local law, it may validate the certificate via conventional path discovery and validation. In such a case, the self-signed Issuer certificate serves as the Trust Anchor, and the relying party can determine the validity of the subscriber's end entity certificate by reference to a public CRL issued by the Participant's CA, such as by reference to a CRL Distribution Point specified in field 2.8 of FIG. 1.

The Participant's IdenTrust Customer Agreement requires that if the relying party wishes to use the certificate within the IdenTrust System, and therefore to bind the certificate at any given moment of reliance to the Participant's IdenTrust policy regime, it must validate the certificate in the manner required by that agreement, i.e. via signed OCSP validation request. For External Use of the certificate, the applicable policy regime, such as that specified in a CPS published by the Participant governing such use, will specify what method(s) of validation are permissible. Accordingly, the election by the relying party of the method of validation of the certificate demonstrates its choice of which policy regime to bind to the certificate at a given moment of reliance. If the relying party is a customer of an IdenTrust Participant, it is therefore potentially capable of either means of validating the same certificate, and its choice will demonstrate whether the certificate is governed at that moment under IdenTrust global rules, or local law.

2nd Embodiment

A Second Root CA Certificate (FIG. 3) In another embodiment, the alternate trust domain may be hierarchic, and may have its own Root CA. In such a case, the Participant obtains the signature of the other Root CA upon a certificate containing the public key corresponding to the Participant's certificate signing private key. In such a fashion, path discovery and validation during External Use will proceed to the trust anchor of that alternate trust domain, in this case, to its Root CA. In other words, in such a deployment, the Participant operates a CA that is both a Sub-CA of the IdenTrust Root CA and a Sub-CA of the other Root CA, which share a common key pair for signing and validating subscriber certificates. The two Sub-CAs can be configured to share substantial portions of their infrastructure, thereby substantially reducing the cost of operating both.

3rd Embodiment

Figure 4:
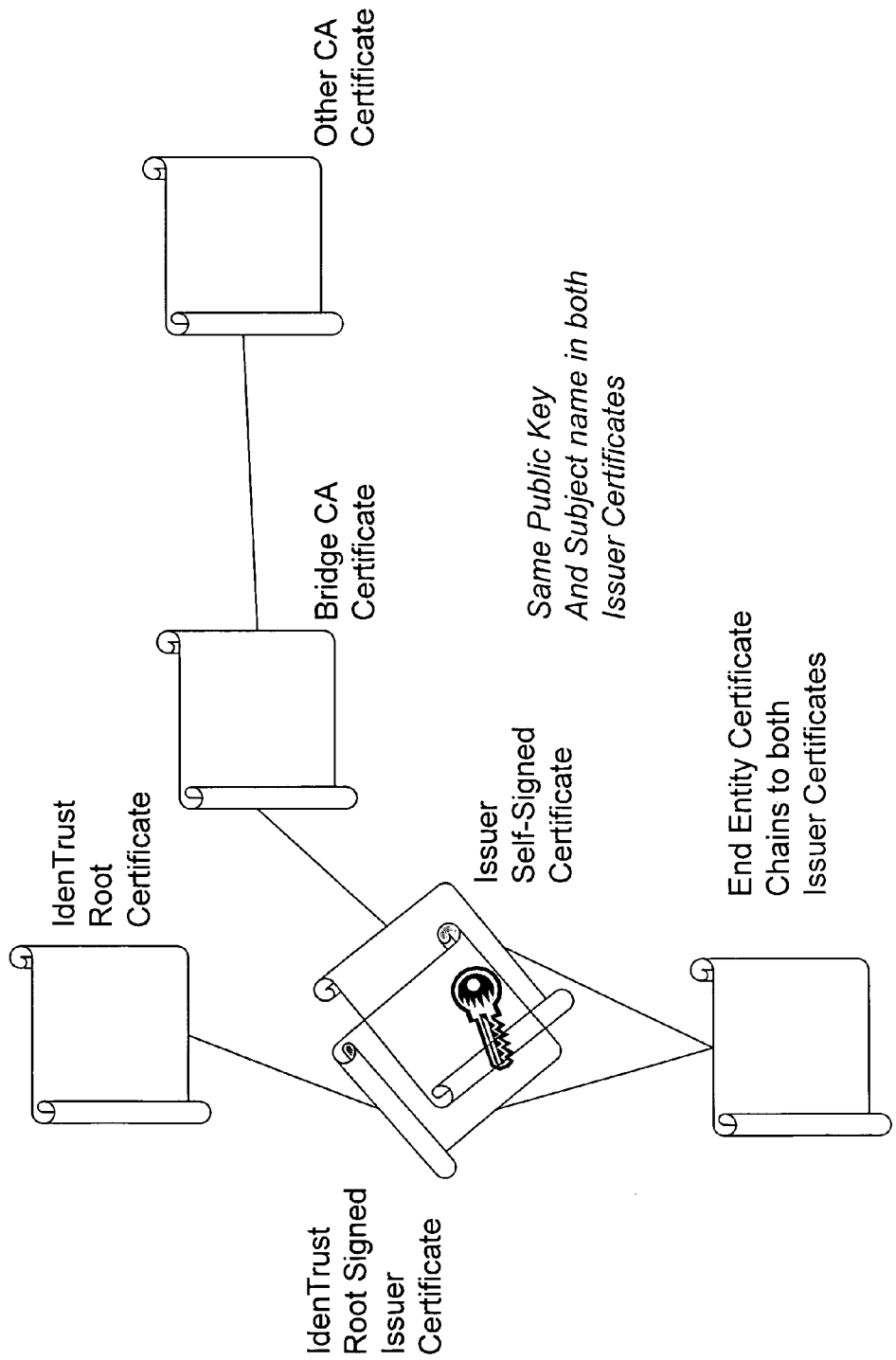
FIG. 4 is a system level diagram of a third embodiment for implementing the present invention.

Connection to a Bridge. (FIG. 4)

In yet another embodiment, the alternate trust domain may be connected to a bridge. Briefly, a bridge CA exchanges cross-certificates with other CAs so that subscribers within one trust domain can rely upon certificates issued within others. In this third embodiment, the Participant's private key signs a cross-certificate issued to the bridge that can be validated against the self-signed Issuer certificate of the alternate trust domain. If desired, the bridge may also issue a cross-certificate to the Participant permitting the Participant's subscribers also to rely upon certificates issued by other CAs connected to it via the bridge.

The method of this invention can be generalized to any other method of certificate validation. A matrix of possible variations could be constructed, for example:

Signed v. unsigned OCSP

Whether the OCSP communication is made via a secure SSL session or not (https v. http)

In the case of SSL, whether the certificate used is low security or high security (such as an IdenTrust Utility Certificate, issued by the CA of a Participant that chains to the IdenTrust Root CA)

OCSP to different addresses (whether hard coded IP addresses, URL AIAs, or a single AIA with multiple locations)

OCSP v. SCVP ("Simple Certificate Validation Protocol") (or any other protocol)

Validation that complies with RFC 3280, and that which does not

OCSP v. path discovery and validation

Almost anything other than path discovery and validation under RFC 3280 to different trust anchors (which would follow two inconsistent validation paths therefore presumably fail to demonstrate actual relying party choice between validation methods).

In addition, the method can be further generalized to any means of distinguishing two trust domains. It need not be limited to distinguishing between trust domains by reference to policy identifiers and validation mechanisms. One could establish by rule or contract that a given Issuer could have alternative issuer names in any of one or more specified fields, or could contain a field, the presence of which creates an alternative certificate processing path, associated with an alternative policy regime.

Finally, as noted earlier, the alternative trust domains linked by a single end entity certificate need not be limited to two. There is no limit to the number of trust domains in which a given end entity certificate can be relied upon. The only limit is whether available certificate processing software will reliably process all the variations.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method comprising:
processing, by a computer, automated application or validation utilities within at least two different trust domains using a single entity digital certificate, which can be relied upon by the automated application or validation utilities in the at least two different trust domains,
identifying, by a computer, each of the at least two different trust domains having its own policy regime governing use of digital certificates, each policy regime to which the single entity digital certificate is alternately to be bound in connection with subject transactions being uniquely identified within the single entity digital certificate by an object identifier that refers to one of the at least two different trust domains, and the single entity digital certificate (i) including certificate profiles required by each of the at least two different trust domains, and (ii) chaining to multiple issuer certificates, each containing a common public key corresponding to a private certificate signing key used by an issuing entity to sign the single entity digital certificate,
wherein said computer implemented method is performed within a public key infrastructure system that does not employ policy mapping between or among the at least two different trust domains and does not link any pair of the at least two different trust domains via cross-certificates.

2. The method of claim 1, wherein at least one of the at least two different trust domains is a closed contractual domain.

3. The method of claim 1, wherein at least one of the at least two different trust domains is an open trust domain.

4. The method of claim 3, wherein the single entity digital certificate is qualified under a law of a European country that complies with European Digital Signature Directive.

5. The method of claim 1, wherein just one of the at least two different trust domains is bound to the single entity digital certificate at any given moment.

6. The method of claim 1, wherein the single entity digital certificate is relied upon by a relying party; and
a current trust domain that is to be bound to the single entity digital certificate is elected by the relying party at the time of reliance, based upon a specific certificate validation methodology selected by the relying party.

7. The method of claim 6, wherein the specific certificate validation methodology is a methodology from a group of methodologies consisting of:
a signed validation request made via an Online Certificate Status Protocol; and
making reference to a publicly posted Certificate Revocation List issued by a participant.

8. The method of claim 1, wherein the at least two different trust domains have different rules governing liability, recourse, and dispute resolution.

9. The method of claim 1, wherein the object identifier comprises at least one of:
a customer agreement;
documents incorporated by reference in a customer agreement;
public law under which a policy is enforced;
a Certificate Policy;
a Certification Practices Statement;
public law under which digital signatures are locally enforceable and digital certificates are locally valid.

10. The method of claim 1, wherein a first one of the at least two different trust domains is trust anchored by a root digital certificate issued to a participant, and a second one of the at least two different trust domains is trust anchored by a digital certificate self-signed by a certificate authority of the participant.

11. The method of claim 1, wherein a first one of the at least two different trust domains is trust anchored by a first digital certificate that is issued to a participant by a first root certificate authority, and a second one of the at least two different trust domains is trust anchored by a second digital certificate that is issued to the participant by a second root certification authority.

12. The method of claim 1, wherein a first one of the at least two different trust domains is trust anchored by a first digital certificate issued to a participant by a first root certificate authority, and a second one of the at least two different trust domains is trust anchored by a second digital certificate that is coupled to the participant by a bridge certification authority digital certificate.

13. The method of claim 1, wherein a first object identifier of the single entity digital certificate comprises a string of numbers.

14. The method of claim 1, wherein a first object identifier of the single entity digital certificate comprises an object identifier that identifies a participant.

15. The method of claim 1, wherein a first object identifier of the single entity digital certificate comprises identification information of an issuer of the single entity digital certificate.

* * * * *